United States Patent [19]

Irwin et al.

[11] 4,449,996
[45] May 22, 1984

[54] PARALLEL MOTION BLANK MOLD OPERATING MECHANISM

[75] Inventors: George W. Irwin, Holland, Ohio; Eustace H. Mumford, Ottawa Lake, Mich.

[73] Assignee: Owens-Illinois, Inc., Toledo, Ohio

[21] Appl. No.: 452,174

[22] Filed: Dec. 22, 1982

[51] Int. Cl.³ ............................................. C03B 9/34
[52] U.S. Cl. ..................................... 65/305; 65/323; 65/357; 65/360
[58] Field of Search ................. 65/317, 323, 357, 358, 65/359, 360, 313, 315, 305

[56] References Cited

U.S. PATENT DOCUMENTS

| | | | |
|---|---|---|---|
| 3,472,639 | 10/1969 | Mumford | 65/357 |
| 3,586,491 | 1/1971 | Mennitt | 65/360 |
| 3,617,233 | 11/1971 | Mumford | 65/323 |
| 4,283,218 | 8/1981 | Staley | 65/360 |

Primary Examiner—S. Leon Bashore, Jr.
Assistant Examiner—Michael K. Boyer
Attorney, Agent, or Firm—Gerald T. Welch; Myron E. Click

[57] ABSTRACT

This application relates to parallel blank mold opening mechanism wherein the split blank molds, of which there are a plurality, are carried in holders that are mounted on horizontal hinge pins adjacent the rear thereof. These hinge pins are carried at the upper end of crank arms and move toward and away from each other during the cycle of operation of a pneumatic motor. Each of the mold holders is provided with a parallel link which is connected between the base of the mold mechanism housing and the holder, such that upon opening and closing of the mold the faces of the molds are maintained in a vertical plane. In addition, the position of the axes of the crank shafts and the hinge pins are such that the hinge pins move over top dead center or through the vertical plane defined by the axis of the crank shaft upon opening or closing. In this manner the molds are actually lifted a slight amount during movement from their closed to their open position. The molds, of which there are three in number disclosed, are held in closed position with equal closing forces due to the fact that the mold holders on one side are pivoted from a central pivot and the mold holders on the other side are split so that the two halves of the mold holders are each individually pivoted about vertical pivot pins.

10 Claims, 11 Drawing Figures

PARALLEL MOTION BLANK MOLD OPERATING MECHANISM

BACKGROUND OF THE INVENTION

In the most commonly used glassware forming machine known as the Hartford IS Machine, a plurality of independent or individual sections are operated in timed relationship to each other and each section receives gobs of molten glass from a feeder generally centrally position with respect to the number of sections in the machines. The gobs are received at the blank or parison forming station of each machine section and with the blanks upwardly open, parisons are formed in the inverted orientation in the blank molds and are subsequently swung over to the blow side for final forming in blow molds. The neck ring mold cooperates at the blank mold for forming the neck of the parison and serves to provide the support to the parison as it is inverted by the operation of an invert arm which carries the molds. The split parison molds, when they are a plurality, are, for the most part, in a conventional IS Machine, hinged from a hinge-pin that is in alignment with the axis of the parisons, or parison molds, and the arms then are moved about the hinge to open and close the split parison molds. Reference may be had to U.S. Pat. No. 3,472,639 which shows such a parison mold holding mechanism. This method of forming articles of glassware has been practiced since the 1920's.

These pivotally mounted mold arms have disadvantages, some of which are related to the differences in degree of mold opening provided between a double or triple gob machine operation. It should be understood that it is necessary that the mold holders and the mold halves carried thereby be capable, on the parison side, of opening in an amount sufficient to permit the invert arm to clear the open molds. Obviously, the mold half adjacent the hinge-pin necessarily opens less than do those more remote from the hinge-pin. Generally speaking simply increasing the angular travel of the pivotally mounted mold support arms cannot be tolerated where the machine is already overcrowded due to space limitations within each of the side by side sections. As might be expected the hinge-pin as it wears will result in the mold themselves not cycling on the same centers each time and in fact it is a constant maintenance problem in keeping the mold mechanisms in alignment over extended periods of operations of machines.

Another disadvantage relates to the requirements for cooling the molds and the use of fixed wind of horns as has been the practice with the horns positioned to feed air against the backs of the molds. It can be seen that this system of cooling is perhaps not as economical as one in which the air will be brought into the mold holders and then distributed evenly to the backs of the molds in a controllable manner.

SUMMARY OF THE INVENTION

It is an object of the present invention to provide a mechanism for supporting the parison molds of a plural cavity mold operation such that the molds open and close with their faces generally parallel to each other. It is an additional object to this invention to eliminate the hinge-pin and its pivotally mounted mold arms and to thereby eliminate the shortcomings of the prior art with regard to the closing forces obtainable. Accordingly, the present invention provides parallel motion blank mold operating mechanism which supports the blank mold halves in a manner that they will be slightly lifted when they are initially started open and thus obviates excessive wear as a result of the molds moving relatively to the neck molds and thimble mechanism which is carried by the invert arm. Additionally, the present invention provides a controllable system for feeding cooling air into the mold holders which are hollow members through which air is passed and permitted to impinge on the reverse side of the molds in a specific pattern.

DETAILED DESCRIPTION OF THE DRAWINGS

Figure 1:
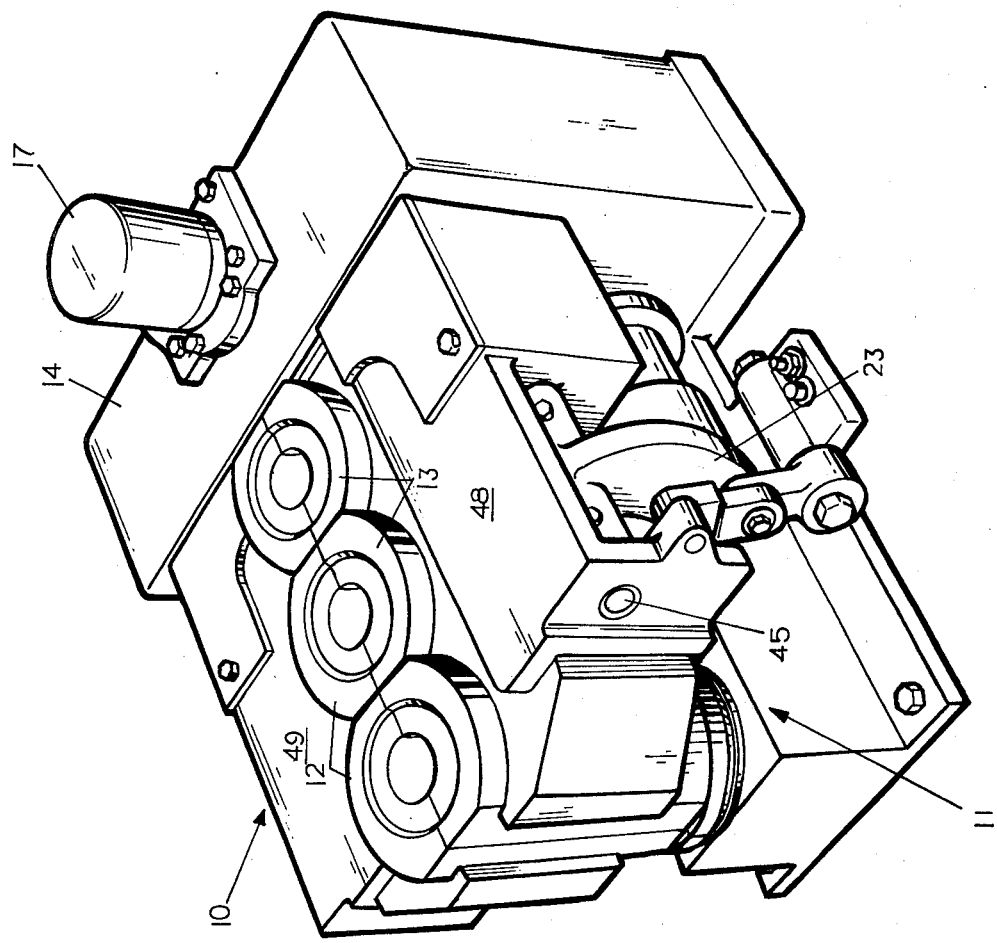
FIG. 1 is a schematic perspective view of the blank mold apparatus of the invention.
Figure 2:
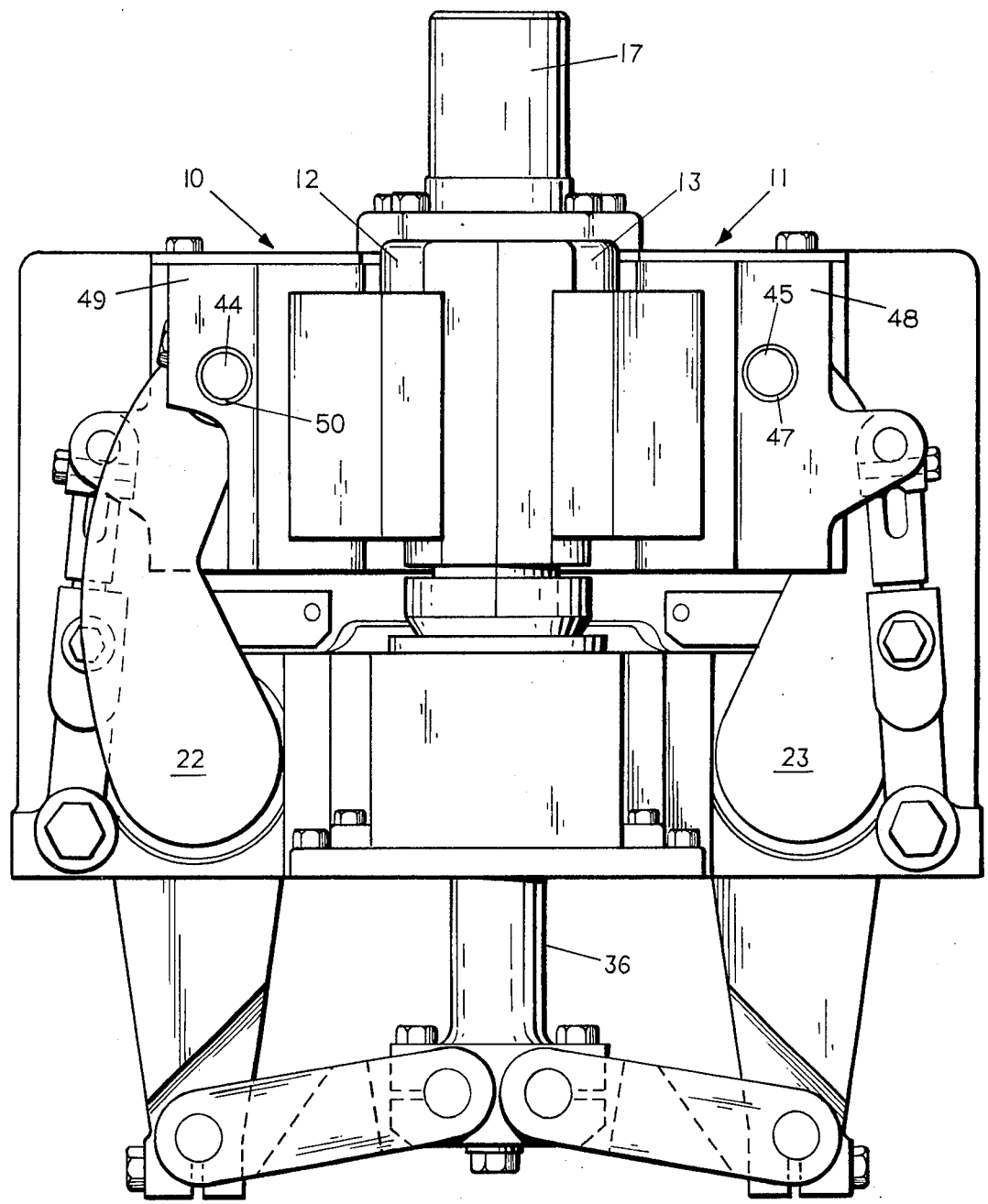
FIG. 2 is a front elevational view of the apparatus of FIG. 1.

While the following description is specifically directed to the embodiment shown where three parison molds, which are split, are movable toward and away from each other while maintaining their faces parallel, it should be apparent that the same mechanism could have utility in supporting and operating blow molds as well as parison molds and in any number.

Mold holders, generally designated 10 and 11, each support three mold halves designated 12 and 13, respectively. To the rear of the mold halves is a stationary casting 14, which will later be described in detail, that houses the controls for cooling air to the molds and, in addition, serves as the mounting means for a vertical cylinder generally designated 16. Extending above the cylinder 16 is an end cap 17 which provides clearance for the movement of a piston rod, later to be described. The particular arrangement shown in FIG. 1 shows the molds in their closed position.

Figure 3:
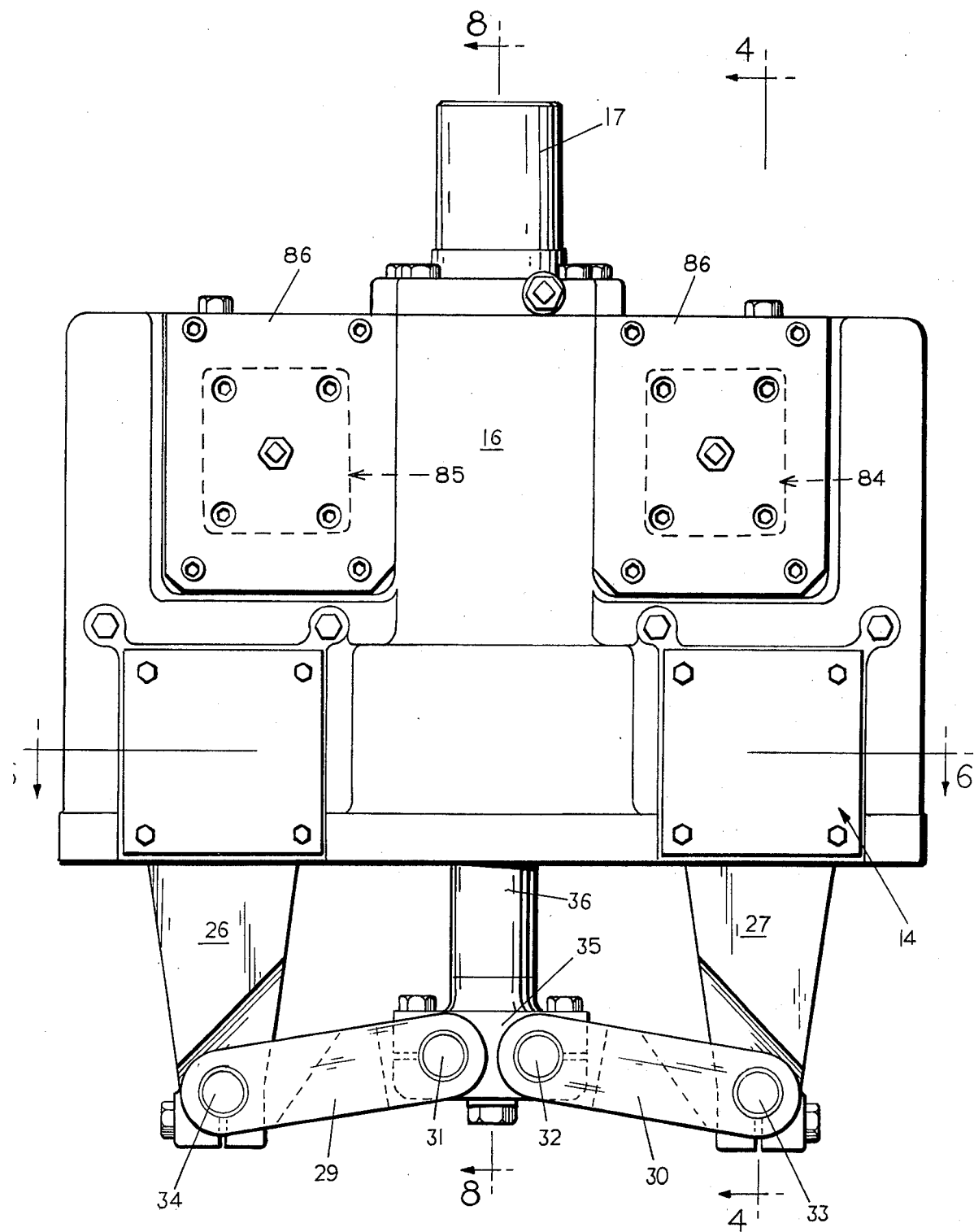
FIG. 3 is a rear elevational view of the apparatus of FIG. 1, FIG. 4, is a cross-sectional view taken generally at line 4—4 of FIG. 3, FIG. 5, is a cross-sectional view taken at line 5—5 of FIG. 4, FIG. 6, is a cross-sectional view taken at line 6—6 of FIG. 3.
Figure 4:
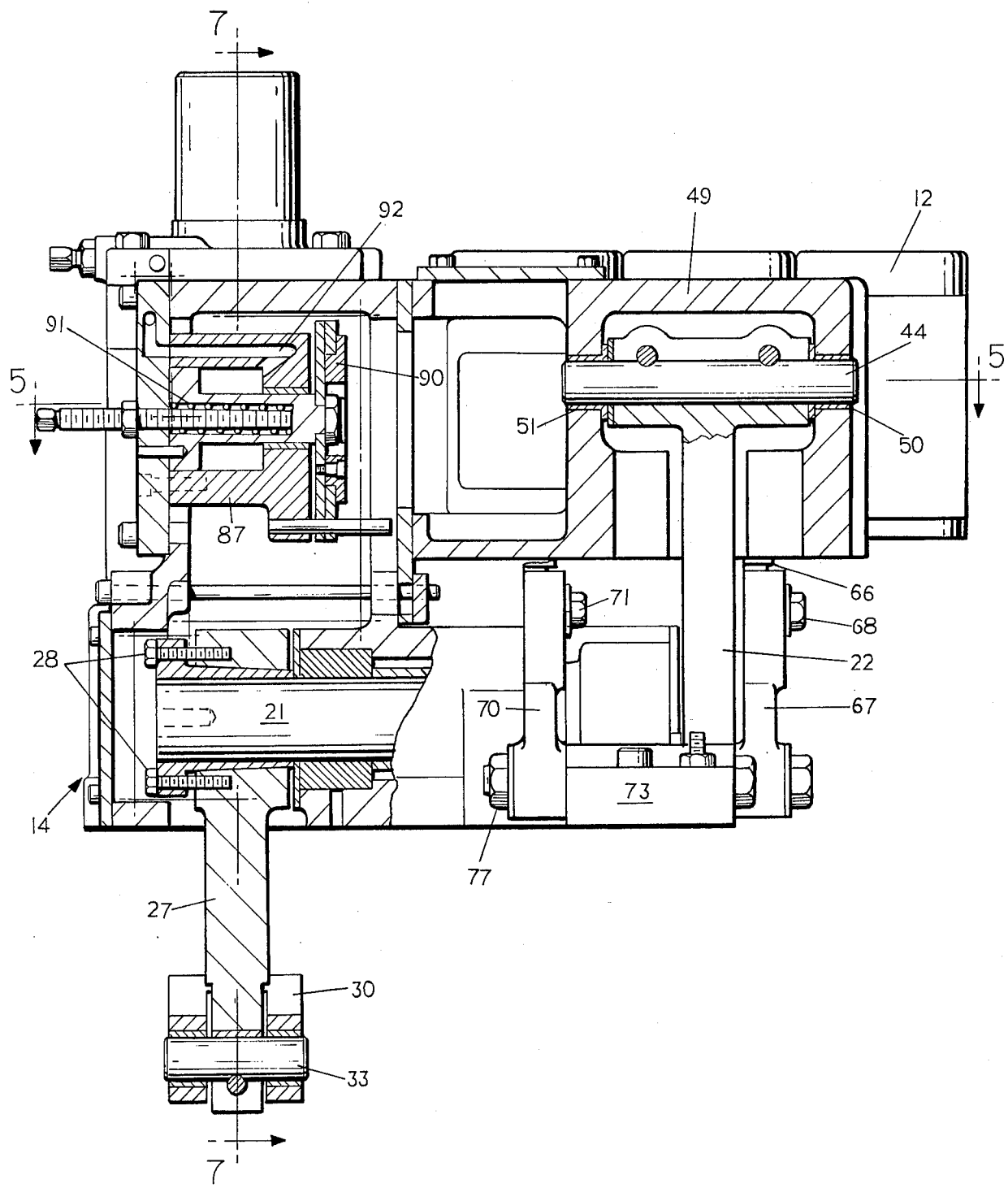

As shown, with reference to FIGS. 1, 3 and 4, the housing 14 generally is rectangular in shape. However, with reference to FIG. 6, which is a sectional view along the lower portion of the mechanism generally taken at the line 6—6 of or FIG. 3, shows that the casting or main housing 14 has portions 18 and 19 which extend to the right as viewed in FIG. 6. The two outstanding end portions 18 and 19 of the casting or housing 14 serve to provide the bearing support for a pair of horizontal shafts 20 and 21. The shafts 20 and 21 actually are made integral with a pair of radial arms 23 and 22, respectively. The arms 22 and 23 in effect serve as crank arms for the output from the shafts 20 and 21. The other end of the shafts 20 and 21 are connected, through tapered sleeve bushings 24 and 25, to a pair of crank arms 26 and 27. The tapered sleeve bushings 24 and 25 are bolted to the arms 26 and 27 by a plurality of bolts 28. As can readily be seen, with the tightening of the bolts 28 tapered sleeve bushings 24 and 25 will clamp the arms 26 and 27 to the end of the shafts 20 and 21. As can best be seen in FIG. 3, the crank arms 26 and 27 extend downwardly and are pivotally pinned to a pair of links 29 and 30 which in turn have their other ends pivoted to a pair of pins 31 and 32. As can be seen in FIG. 4 the crank arm 27 is connected to the link 30 by a pin 33. The link 29 is connected to the crank arm 26 by a pivot pin 34 in a similar fashion as the crank 27 is connected to the link 30 by the pivot pin 33. The links 29 and 30 are bifurcated at either end and thus the pivot pins 31, 32, 33 and 34 extend through the bifurcated ends and the bushings are carried in the links 29 and 30. The two pivot pins 31 and 32 extend through, and are clamped in, a lower cross head 35 which is in turn connected to the lower end of a piston rod 36. The piston rod 36 extends vertically upwardly from the head 35 through a lower cylinder head 37 and thereabove is formed integral with a piston 38. The rod 36 also extends above the piston 38 and is guided by a sleeve bearing 39 in the upper end cap 17. The lower portion of the end cap 17 serves as the cylinder head at the upper end of the cylinder 16. A sleeve bearing 40 is shown as provided between the lower cylinder head 37 and the piston rod 36.

Figure 8:
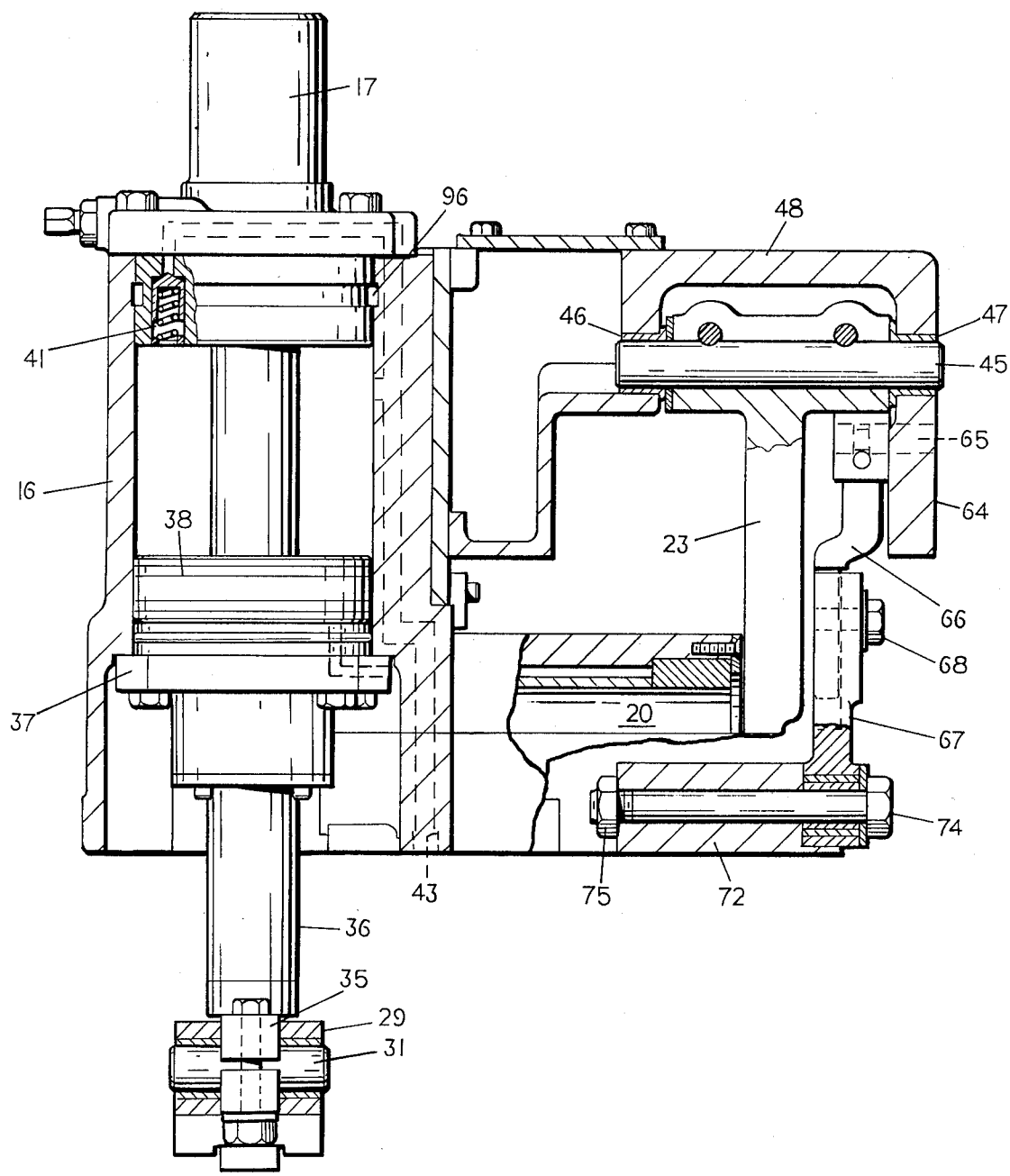
FIG. 8 is a cross-sectional view taken at line 8—8 of FIG. 3.

The piston 38, as best seen in FIG. 8, is actuated by the introduction of air under pressure through a check valve 41 in the upper cylinder head or end cap 17. Air under pressure is brought in through the cylinder wall base at 43 and extends upwardly through passageways formed in the wall of the cylinder 16 into the end cap 17, thence across to an opening above the check valve 41, and then through the check valve to the chamber above the piston 38. Raising the piston is provided by air entering another passage formed adjacent the opening 43 which communicates with another passage in the cylinder wall 16 to open into the lower cylinder head 37 and into the chamber just above the cylinder head. From the foregoing description it can be seen how the crank arms 22 and 23 are operated in opposite directions by the operation of the piston 38.

Figure 5:
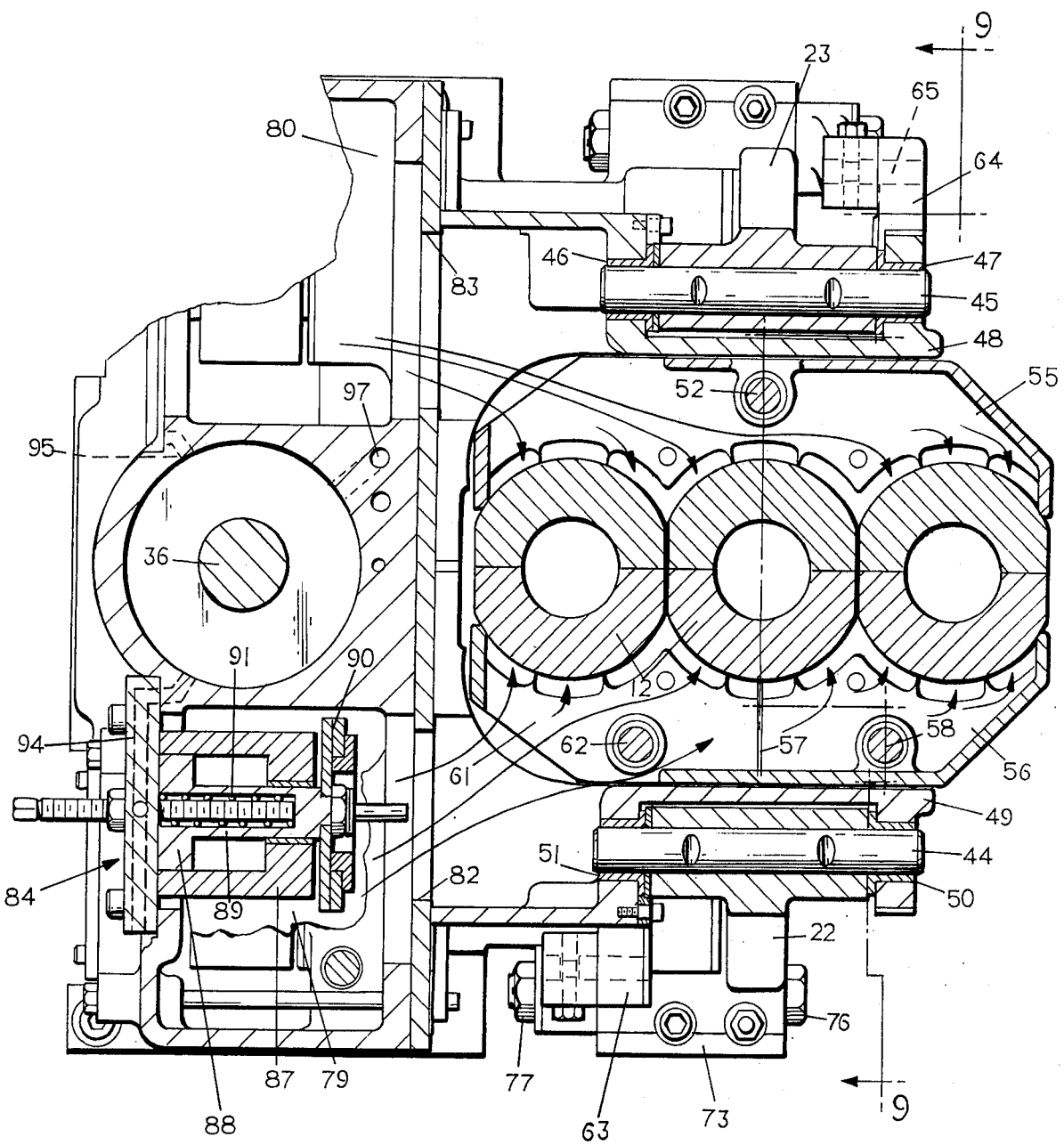
Figure 9:
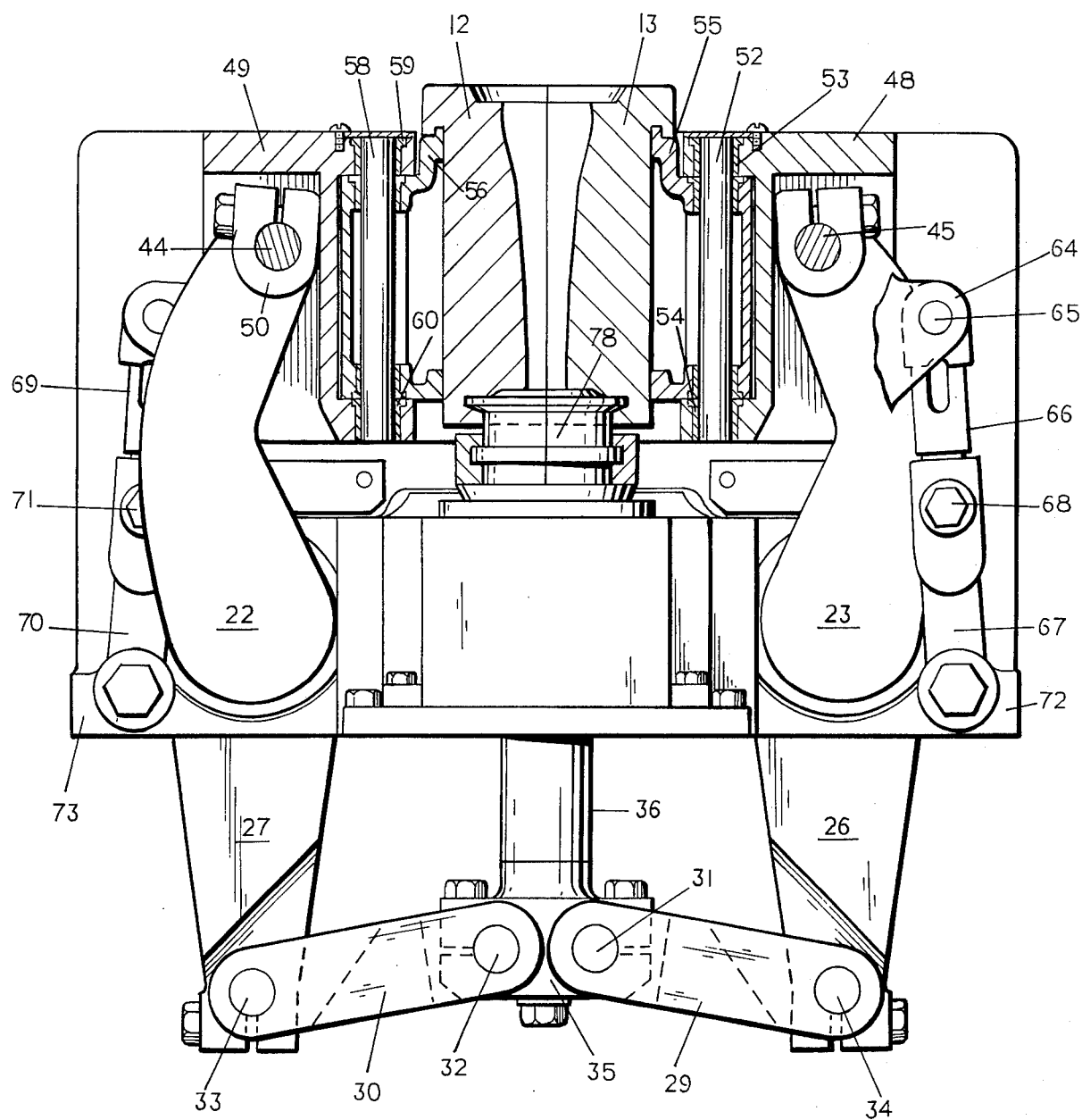
FIG. 9 is a cross-sectional view taken generally at line 9—9 of FIG. 5.

The ends of the crank arms 22 and 23 that are remote from their integrally formed shafts 21 and 20, carry horizontal pins 44 and 45. As can be seen from FIGS. 4 and 5, the pin 45 is a fairly long pin and the upper end of the arm 23 has an elongated T section through which the pin 45 extends and to which it is fixed. The outer ends of the pin 45 extend through sleeve bearings 46 and 47 provided in a mold holder carrier 48. A similar mold holder carrier 49 is shown in FIG. 4 and is supported from the ends of horizontal pin 44 by a pair of sleeve bearings 50 and 51. The mold holder carrier 48 carries a vertical pivot pin 52 as shown in FIGS. 5 and 9. The pivot pin 52 is supported at its ends in the carrier 48 by a pair of sleeve bearings 53 and 54. Intermediate the sleeve bearings 53 and 54 the mold holder carrier 48 supports a mold holder 55. The mold holder 55 has three upwardly directed areas upon which the mold halves 13 are mounted.

It should be noted from FIG. 5, that the mold holder 55 may pivot to a limited extent about the pin 52. The opposite side of the mold support apparatus shows, in FIGS. 5 and 9, a similar mold holder. This holder, however, is split into two pieces, designated 56 and 61, at the split line 57. The mold holder half 56 is pivotally mounted on a vertical pin 58. The pin 58 is mounted within vertically lined openings formed in the holder carrier 49 with sleeve bearings 59 and 60 provided to support the mold holder half 56 relative to the pin 58. The other half 61 of the mold holder is pivotally supported by a vertical pin 62, which extends through aligned openings in the mold holder carrier 49 similarly as does the pin 58. In this manner the two mold holders 56 and 61 each support one and a half parison mold halves upon the closing of the parison mold by the operation of the piston 38 to move the two horizontal pins 44 and 45 towards each other. The mold halves 12 and 13 will become clamped with equal forces since the force at the right-hand side, as viewed in FIG. 9, is applied through the pin 52 and the force at the left-hand side is provided through the pins 58 and 62.

In order to maintain the mold halves 12 and 13 parallel along their parting line during opening and closing movement, the mold holder carriers 48 and 49 are formed with outstanding bosses 64 and 63. The boss 64, as best shown in FIG. 8, is toward the forward end adjacent the sleeve bearing 47 which supports the pivot pin 45. The boss 64 carries a pivot pin 65. The pin 65 extends through the boss 64 and through the upper end of a two piece parallel link member 66. The link member 66 is formed with an upper section which extends into an opening formed in the back of a lower section 67. The upper end of the member 67 is provided with an elongated opening through which a horizontal bolt 68 extends. Bolt 68 may be loosened and members 66 and 67 may be moved apart to whatever adjusted position is desired and the bolt 68 tightened back down to maintain the link member 66 at the desired length. Similarly, the boss 63 carries the upper end of a second parallel link member 69, the lower end of which extends along the back of an upwardly extending portion or member 70. The lower member 70 is formed with a vertical slot within which a bolt 71 may be positioned.

Figure 6:
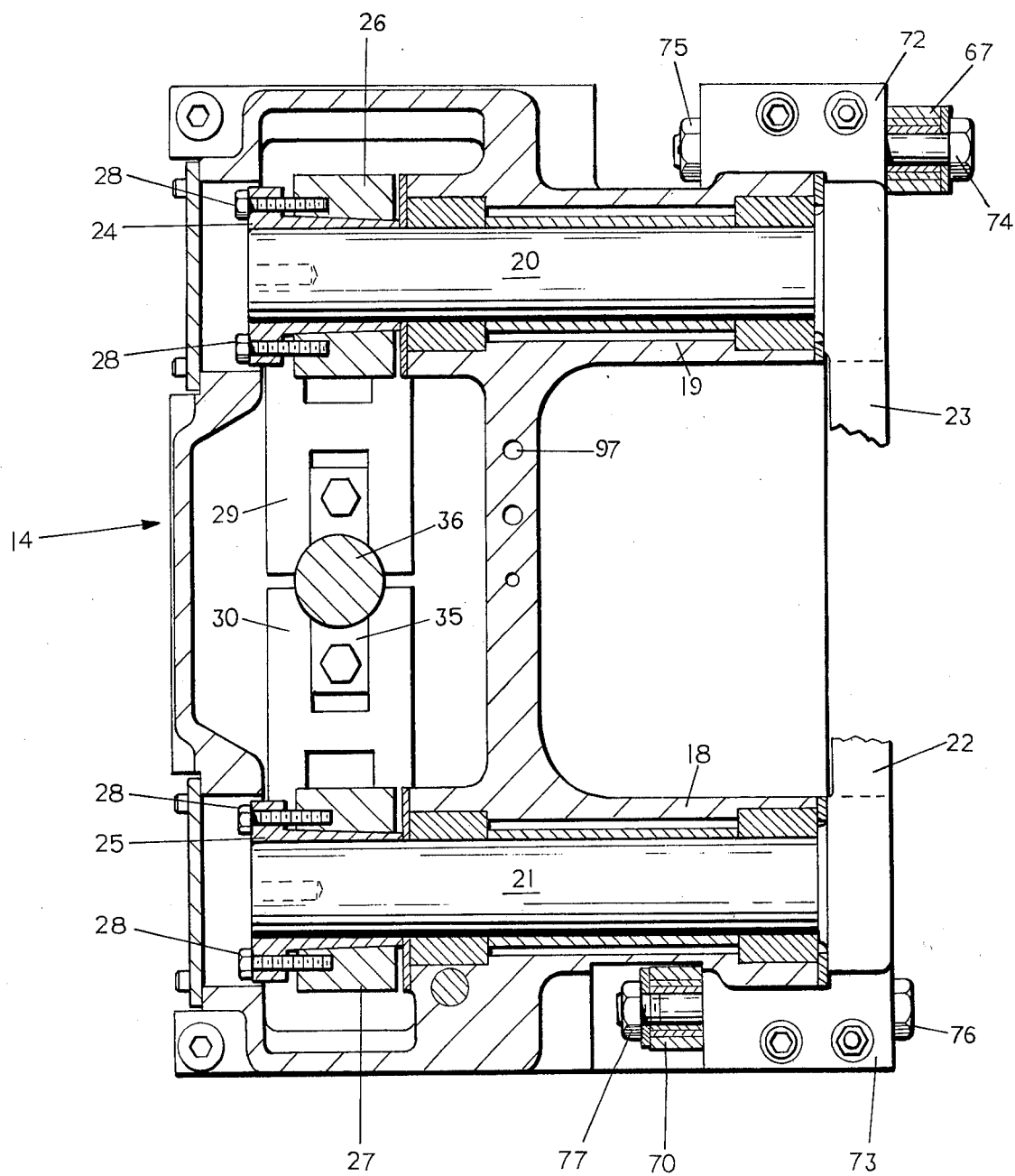
Figure 7:
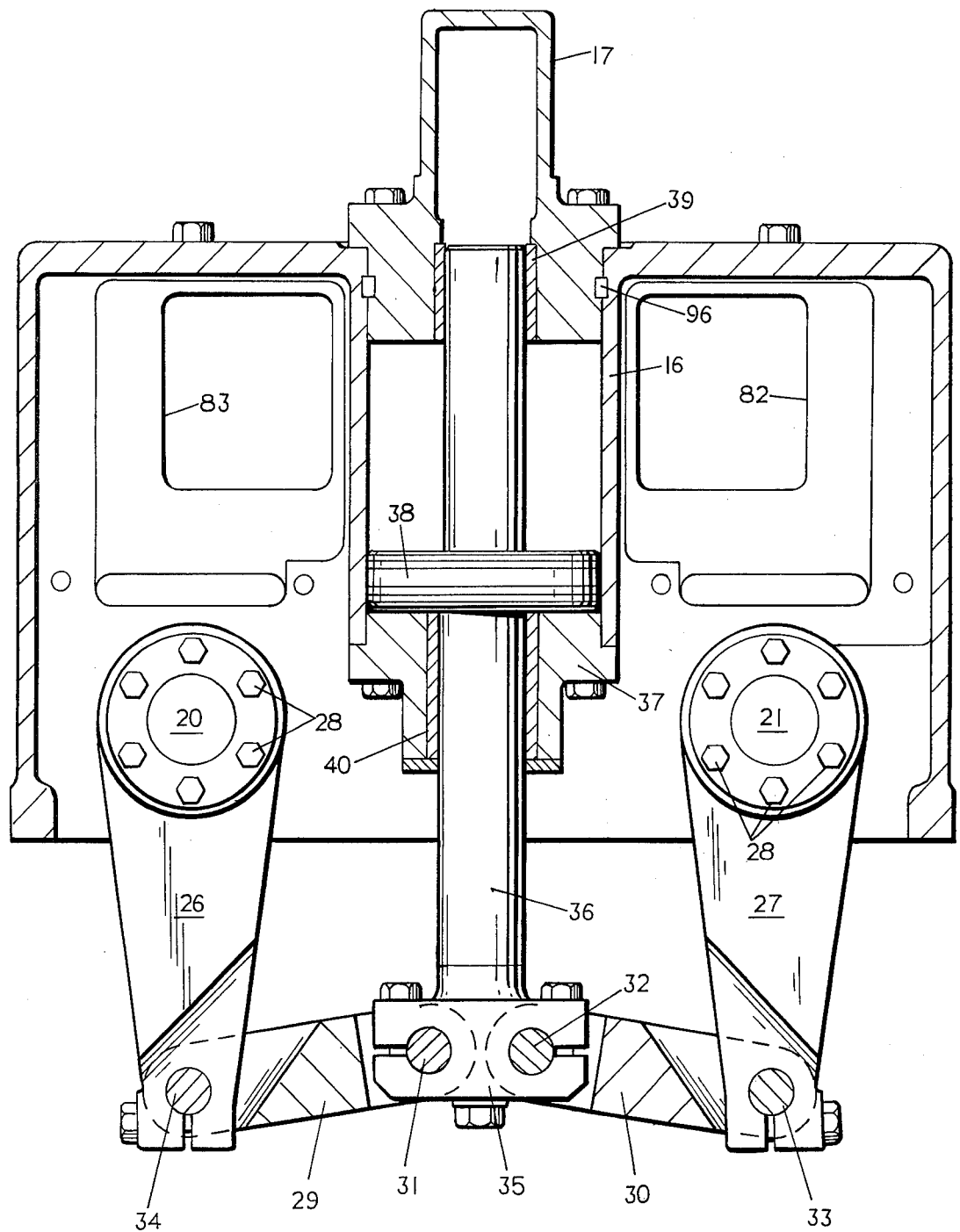
FIG. 7 is a cross-sectional view taken at line 7—7 of FIG. 4.
Figure 10:
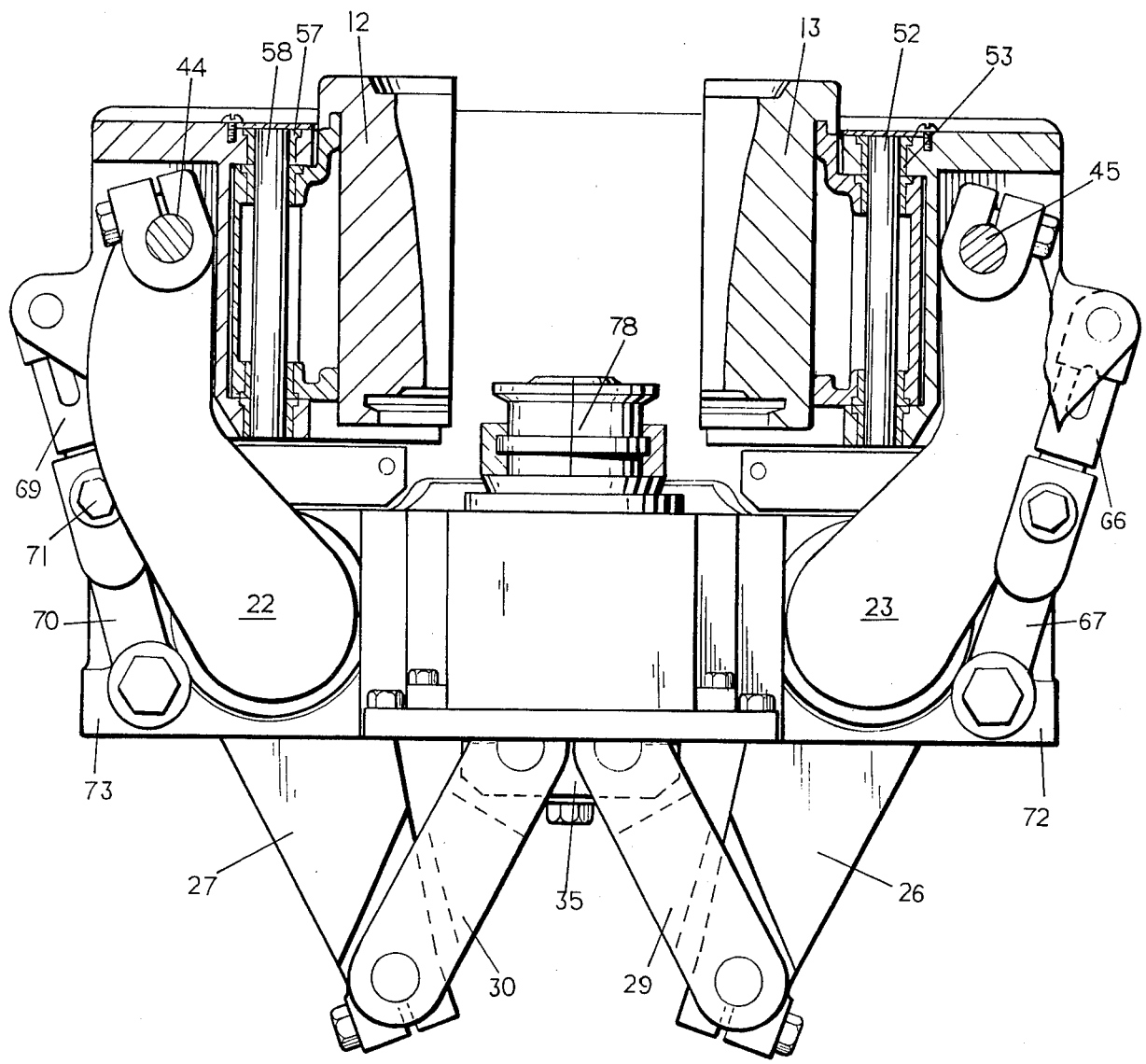
FIG. 10 is a cross-sectional view similar to FIG. 9 but with the molds open.

As best shown in FIG. 6, the forwardly extending portions 18 and 19 also, while serving as the support for shafts 21 and 20, are provided with horizontal bosses 73 and 72. The boss 72 is drilled horizontally for receiving a bolt 74. The bolt 74 is provided with a nut 75 on its opposite end. As can best be seen in FIG. 6, the bolt 74 serves as the pivot for the lower member 67 of the adjustable parallel link member. Similarly, the boss 73 supports a bolt 76 which has a nut 77 thereon and adjacent the nut is positioned the lower member 70 of the parallel link member 69. The links 66 and 69 are adjustable links so as to adapt the mechanism to close the molds precisely during operation. It should be kept in mind that the mold halves 12 and 13, as seen in FIGS. 9 and 10, move apart upon rotation of the arms 22 and 23 moving the pins 44 and 45 away from each other. As the arms move from the position shown in FIG. 9 to the position shown in FIG. 10, the mold halves 12 and 13 will rise slightly. A neck mold 78 is centrally positioned with respect to the lower ends of the two mold halves 12 and 13. It should be apparent that the axes of the shafts 21 and 20 are slightly outside the axes of the pins 44 and 45 when the molds are closed as shown in FIG. 9. As the mold begins to open the two pins 44 and 45 will pass through the vertical plane passing through the axes of the shafts 21 and 20. Thus, the arms 22 and 23 raise the mold holder carriers 49 and 48 a small amount.

This is significant in that this avoids excessive sliding of the molds on the neck molds and extends the life of the mechanism when it is in operation. The present day forming machines will operate 12 to 15 times a minute, thus, it can be seen that even a slight amount of rubbing in a relative short period of time can result in excessive wear and create a situation where expensive maintenance and frequent periods of down time would be necessary.

The foregoing explains the mechanical operation and movement of the mold halves toward and away from each other and the important aspects of the mechanisms such that the wear on the neck rings and on the mold halves is avoided to a great extent by the fact that the molds are slightly lifted at the time they are moved toward and away from each other and also the molds when closed are clamped with an equalizing force. It is important when closing the molds on machines that have more than one mold half on each side that the forces be fairly equal principally because any misalignment that might occur in other closing mechanisms might result in a mold being cracked opened slightly. When internal pressure builds up during the formation of the glass into the parison shape the open mold seam results in a bad parison. This is particularly critical in situations where the parison might be formed by the movement of a plunger into the parison mold to a significant depth. Also the fact that any slight crack will produce a chilled seam in the parison which, in turn, when expanded within the blow mold, may also provide a line that appears down along the side of the bottle, such a line may contribute to the weakening of the sidewall of the bottle formed from the defective parison.

Figure 11:
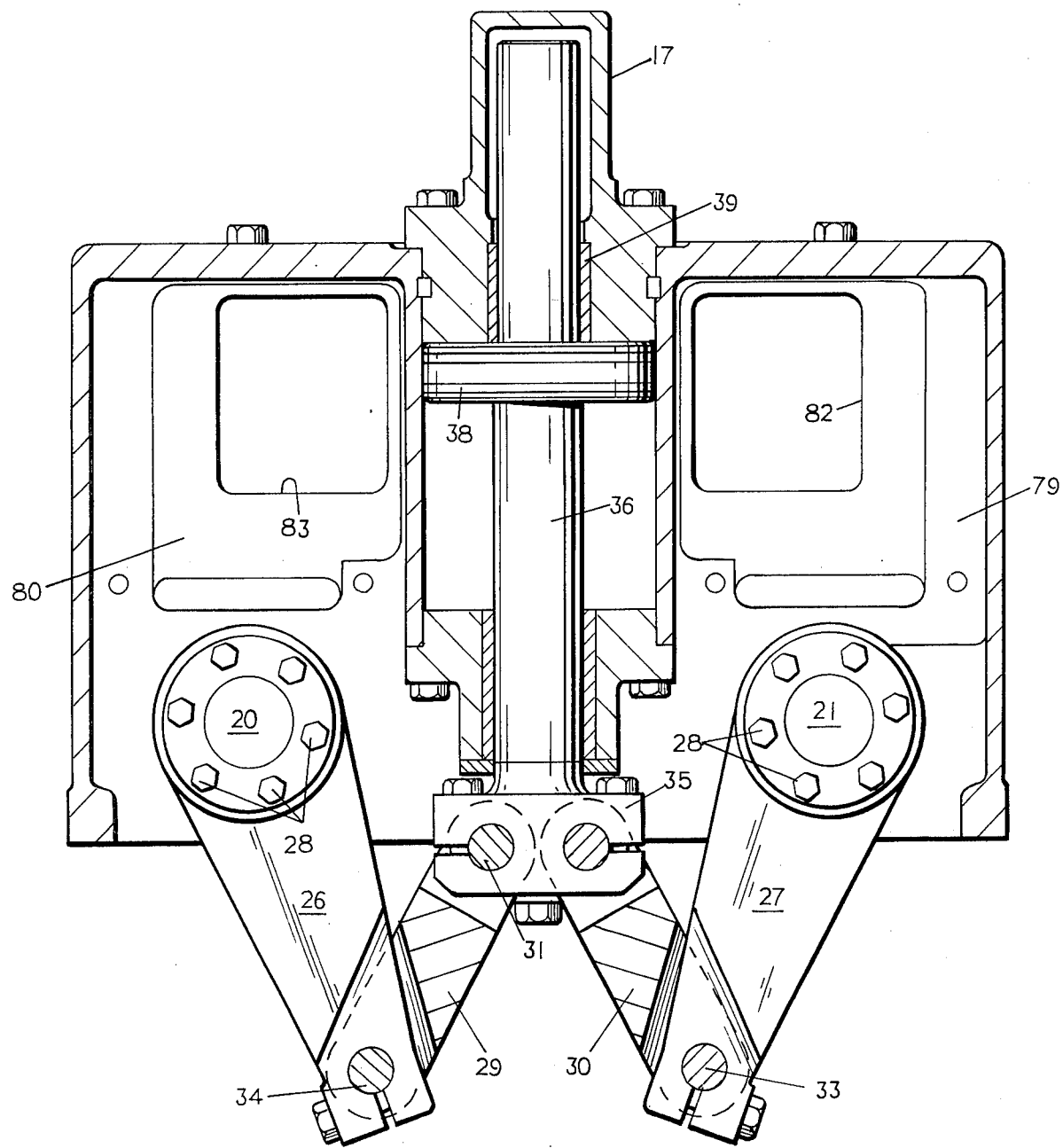
FIG. 11 is a view similar to FIG. 7 showing the piston in its up position.

Turning now specifically to FIGS. 4, 5 and 11, the manner of controlling cooling air to the mold carriers and holder will be described in detail. The housing 14 at each side of the cylinder 16 and above each of the shafts 20 and 21 is provided with a closed chamber generally designated 79 and 80. The cooling air is supplied from beneath the section box through a support plate, which serves as the top of the section box. The cooling air comes upwardly into the two chambers 79 and 80 and as shown in FIGS. 4 and 5. The air which will come through the base will exit through openings 82 and 83, respectively, from the chamber 79 and 80. The opening 83 permits the air to move as shown by the arrows on FIG. 5 into the area behind the mold halves 13 and within the mold holder 55. Likewise, air coming through the chamber 79 will exit through the opening 82 and pass into the mold holders 61 and 56 in back of the mold halves 12. The air exits downwardly through openings at the bottom of the holders adjacent the backs of the molds 12 and 13 in the holders 55, 61 and 56. Air entering toward the mold holders from the chambers 79 and 80 is controlled by dampers generally designated 84 and 85. These dampers 84 and 85 are generally supported on rectangular plates 86-FIG. 3 which are bolted to the back of the housing 14 with the inner sides of the plate carrying a cylinder 87. The cylinder 87, it should be pointed out that there are two in number, with one opposite each of the exit openings 82 and 83 from the chambers 79 and 80. Each cylinder 87 carries a piston 88 which has a piston rod 89 connected thereto and extending outward from the respective cylinder 87. The extending end of the piston rod 89 carries a valve head or damper head 90 which would close the opening 82 or 83 depending on which piston is operated and which head projects toward the opening. The piston rod 89 is hollow and carries a compression spring 91 coaxially thereof biasing the piston rod in the direction to move the damper head toward the opening 82 of the chamber. The piston 88 is shown biased, in a direction opposite to that of the force being applied by the compression spring, by air under pressure in passage 92, as best seen in FIG. 4. Air under pressure in the passage 92 is brought to both of the dampers 84 and 85 through passages 94 and 95 which extend to an undercut 96 formed in the upper cylinder head 17. Air to the undercut 96 comes through vertical passage 97 which extends upwardly into the upper wall, across and down through the middle wall of the cylinder wall 16 in a manner similar to the air being delivered to the main opening and closing piston 38.

While the foregoing description has been directed to the details disclosed and shown in the drawings, it should be apparent to one skilled in the art that the mechanism of the invention can be utilized to operate more or less than three mold halves as is specifically required. Furthermore, the control for the mechanism and its use as a mold opening and closing mechanical system while operated by a single reciprocating pneumatic motor could be controlled or operated by a reversible electric motor through suitable gearing.

We claim:

1. Apparatus for opening and closing a plurality of parison molds simultaneously in a confined space comprising a base, a pair of horizontal, parallel drive shafts supported in bearings above said base, a pair of crank arms formed at one end of each drive shaft, a pair of opposed mold holder carriers positioned above said base and each adapted to hold at least one mold half, a horizontal pivot pin adjacent the upper portion of each mold holder, means connecting the other end of said crank arms to said first pivot pins for supporting the mold holder carriers above the base, a second pair of arms pivotally connected between the base and the mold hold carrier, said second arms being generally parallel to said crank arms to thereby serve as parallel connections between the base and each mold holder carriers, a plurality of neck molds extending up from the base into position between the parison mold halves, drive means connected to said drive shafts for simultaneously rotating said drive shafts each in opposite directions, said drive means moving said mold holder carriers toward each other until the mold halves carried thereby are in abutting relationship and in engagement with the neck molds, with the centers of rotation of the drive shafts and the pivot pins being in a plane that is at an angle with respect to a vertical plane defined by the parting line of the mold halves, with the axes of the pivot pins being closer to the vertical plane than the axes of the drive shafts.

2. The apparatus of claim 1 wherein said second pair of arms includes adjustable means for varying length of said second pair of arms.

3. The apparatus of claim 1 wherein said drive means comprises a vertical, reciprocating motor.

4. The apparatus of claim 3 wherein said reciprocating motor is a piston-cylinder motor with the cylinder mounted on said base.

5. The apparatus of claim 4 wherein the cylinder of said piston cylinder motor is mounted vertically on said base intermediate said drive shafts, a piston rod extending downward from said cylinder, and linkage means connecting said piston rod to said drive shafts.

6. The apparatus of claim 5 wherein said linkage means comprises a second pair of crank arms connected to said drive shafts, said second crank arms having one end clamped to the drive shafts, and a pair of connecting links each pivotally connected to the other end of said second crank arm and the lower end of said piston rod.

7. The apparatus as set forth in claim 1 further including generally U-shaped mold holders within the mold holder carriers, said mold holders defining hollow areas behind the mold halves, a vertical end wall extending upward from the base including a pair of openings formed in said wall communicating with the hollow areas behind each of the mold halves, means for supplying air under pressure to a manifold in back of said end wall overlying said openings for directing cooling air into the hollow areas of said mold holders.

8. The apparatus of claim 7 further including valve means in each manifold for opening and closing the openings in said end wall.

9. The apparatus of claim 8 wherein said valves are spring biased into closed position and air operated into the open position.

10. The apparatus of claim 1 wherein said plurality of parison molds is three in number, and means for mounting the three parison mold halves on one side in a single holder that is pivoted about a vertical pin intermediate the length thereof and the three mold halves on the opposite side are carried in the holder that is split with each half of the holder pivoted about a separate vertical pin to thereby provide equal closing forces to all of the mold halves.

* * * * *